Figure 1:
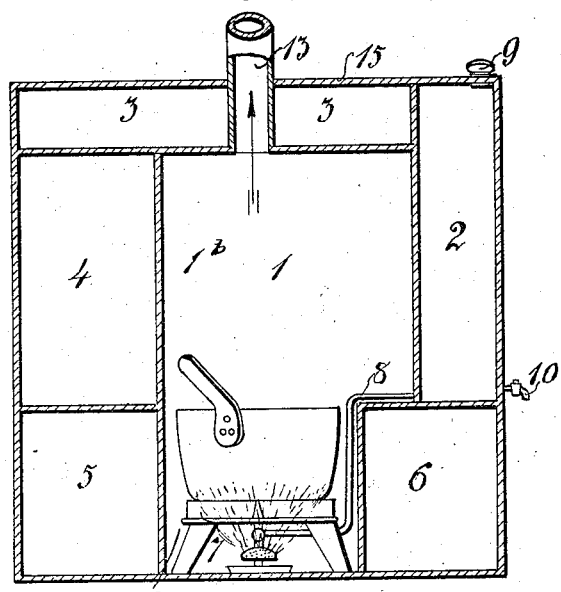

A. F. JOHANSSON.
COOKING STOVE FOR OPEN BOATS OR THE LIKE PURPOSES.
APPLICATION FILED MAR. 20, 1918.

1,277,316.

Patented Aug. 27, 1918.

Inventor.
A. F. Johansson.
By H. R. Kerslake
Atty.

UNITED STATES PATENT OFFICE.

ALLAN FOLKE JOHANSSON, OF GOTTENBORG, SWEDEN.

COOKING-STOVE FOR OPEN BOATS OR THE LIKE PURPOSES.

1,277,316.    Specification of Letters Patent.   Patented Aug. 27, 1918.

Application filed March 20, 1918. Serial No. 223,643.

*To all whom it may concern:*

Be it known that I, ALLAN FOLKE JOHANSSON, a subject of the King of Sweden, residing at Gottenborg, in the county of Gottenborg and Bohus, and Kingdom of Sweden, have invented new and useful Improvements in Cooking-Stoves for Open Boats or the like Purposes, of which the following is a specification.

This invention relates to cooking stoves especially designed for outdoor use, such as in open boats, ships' lifeboats and the like, where a portable and handy cooking apparatus may be desirable or necessary.

One object of this invention is to provide a cooking apparatus which combines a neat appearance with a high degree of usefulness, so that it will occupy the least amount of space, but nevertheless will answer every reasonable request of a reliable stove. Another object of the invention is to provide a cooking stove, which is always ready for use without need of any special precaution for placing the cooking stove in a wind protected place or for arranging the necessary means for the draft. A further object of this invention is to provide a single compact article, which includes the cooking stove itself as well as compartments for housing all the utensils and other materials which are necessary for preparing the meal, such as the fuel for the stove, the cooking utensils, and a certain quantity of requisite food or the like. Such a cooking apparatus is especially desirable in lifeboats, in localities where there are official regulations governing the requisite inventory in ships' lifeboats. With my apparatus the casing will include compartments to house the minimum quantity of food and water.

The invention comprises a casing provided with a liquid or gaseous fuel cooking stove of any suitable type, which stove is rigidly mounted within the casing and is connected by a pipe to a fuel reservoir, also inclosed in the casing. The casing further is provided with an adjustable draft opening near the bottom of the stove compartment and in the top with a pipe for the exit of the smoke, so that the stove is wind protected by being inclosed within the casing and will burn with a full and calm flame. At the sides, above and, if wanted, beneath the stove compartment, there are provided compartments for food, utensils, drinking water or the like.

In the accompanying drawing there is illustrated an embodiment of the invention, but I wish it understood that I do not limit myself to the special embodiment shown, as the dimensions and shape of the casing, as well as the arrangement of compartments, may be changed to conform to different circumstances and needs. Also I do not want to limit myself to any special type or shape of the stove itself.

Figure 2:
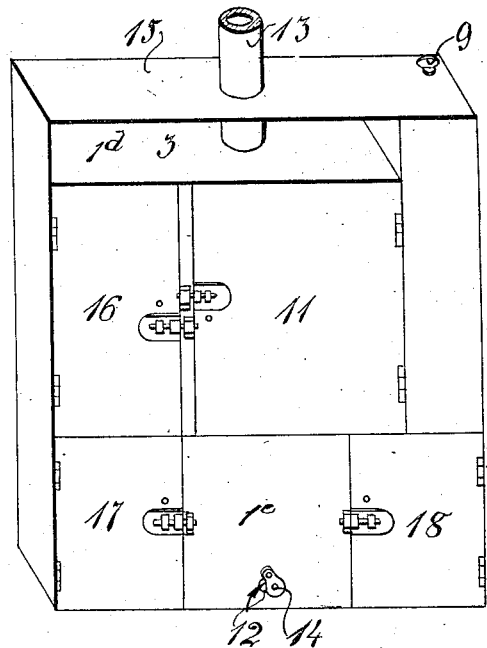

In the drawing Figure 1 is a vertical sectional view of the apparatus and Fig. 2 a perspective view of the same.

My improved apparatus comprises a casing provided with a central compartment having an upper cooking space 1 provided with a hinged door 11. A lower heating space $1^a$ is arranged beneath the space 1 and the upper part of the heating space and the lower part of the cooking space communicate with each other. The rear wall of the casing forms the rear walls of the spaces 1 and $1^a$ and the sides of the space $1^a$ are closed by the side walls $1^b$ of the water or food chambers 5 and 6, while the front of the lower space is closed by a wall $1^c$. It will thus be seen that the lower space is permanently closed on all sides and open at its top. A liquid or gaseous fuel burner stove 7 is located in the space $1^a$ near the bottom of the same, so that the opening of the door 11 will not affect the flame, for the reason that the stove is arranged some distance below the bottom edge of the frame of the door 11. A fuel chamber or reservoir 2 is located in the casing at one side of the space 1 and a fuel feeding pipe 8 extends from said reservoir to the burner of the stove 7. The front wall $1^c$ of the space $1^a$ is provided near its bottom with a draft opening 12 closed by a swinging valve 14 so that air may be fed to the burner without opening the door 11.

A compartment 4 for water, food, or the like, is located in the casing and its top forms a continuation of a shelf $1^d$, that serves as the bottom of an open front compartment 3, which may be used for storing cooking utensils. A smoke pipe 13 extends from the shelf $1^d$, through the compartment 3, and out of the top 15, for permitting the smoke to pass out of the space 1.

The fuel reservoir has a filling opening closed by a cover 9 and a faucet 10 near its bottom for use in emptying the fuel reservoir.

Doors 16, 17 and 18 close the fronts of the compartments 4, 5 and 6.

In use the compartments 4, 5 and 6 are filled with food and water, the compartment 2 with fuel, and the compartment 3 with the cooking utensils, and such an apparatus will form part of the equipment of a lifeboat or the like. When it is desired to use the apparatus the same may be utilized without further preparation or assemblage and the stove will operate efficiently regardless of the direction of the wind.

By arranging the stove in the lower part of the space 1ª below the lower edge of the frame of the door 11, I provide a construction which will permit the burner to burn evenly without being affected by any draft entering through the frame of said door.

The heat from the stove will heat the whole apparatus to such a degree that the apparatus will also serve as a heating device for the occupants of the lifeboat in cold weather.

What I claim and desire to secure by Letters Patent is:

1. A cooking and heating apparatus comprising a casing provided with a central compartment having a cooking space provided with an open bottom and a door, a heating space arranged beneath the cooking space and having closed sides, the top of the heating space being open and communicating with the cooking space, a fuel burner located near the bottom of the heating space and away from the open top of the same, a draft opening arranged in one wall of the heating space near the bottom of the same for feeding air to the burner, a fuel reservoir located in the casing, a pipe leading from the fuel reservoir to the burner, and a smoke pipe arranged at the top of the casing to permit the smoke to exit from the central compartment.

2. A cooking and heating apparatus comprising a casing provided with a central compartment having a cooking space provided with an open bottom and a door, a heating space arranged beneath the cooking space and having closed sides, the top of the heating space being open and communicating with the cooking space, a fuel burner located near the bottom of the heating space and away from the open top of the same, a draft opening arranged in one wall of the compartment near the bottom of the same for feeding air to the burner, a fuel reservoir located in the casing, a pipe leading from the fuel reservoir to the burner, provision compartments located at the sides of the heating space, another provision compartment arranged at one side of the cooking space, the tops of the last named compartment and the cooking space forming a shelf within the casing and a smoke pipe passing from the central compartment through the top of the casing.

In testimony whereof I have affixed my signature in presence of two witnesses.

ALLAN FOLKE JOHANSSON.

Witnesses:
 GUSTAV SEIT,
 ALEX. FRIZELBURG.